US006976224B2

(12) United States Patent
Nii

(10) Patent No.: US 6,976,224 B2
(45) Date of Patent: **\*Dec. 13, 2005**

(54) INFORMATION PROCESSING APPARATUS AND METHOD WITH GRAPHICAL USER INTERFACE ALLOWING PROCESSING CONDITION TO BE SET BY DRAG AND DROP, AND MEDIUM ON WHICH PROCESSING PROGRAM THEREOF IS RECORDED

(75) Inventor: Yukako Nii, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/499,401

(22) Filed: Feb. 7, 2000

(65) Prior Publication Data

US 2003/0142120 A1 Jul. 31, 2003

(30) Foreign Application Priority Data

Feb. 8, 1999 (JP) .................................. 11-030145

(51) Int. Cl.[7] .............................................. G06F 3/00
(52) U.S. Cl. ....................... 715/769; 715/837; 715/862
(58) Field of Search ............................... 345/769, 846, 345/837, 835, 862

(56) References Cited

U.S. PATENT DOCUMENTS 5,546,527 A * 8/1996 Fitzpatrick et al. ......... 345/769
5,583,984 A   12/1996 Conrad et al. .............. 395/340
5,721,853 A * 2/1998 Smith ......................... 345/790
5,745,112 A * 4/1998 Hirose ........................ 345/769
5,767,852 A * 6/1998 Keller et al. ................ 345/835
5,777,616 A * 7/1998 Bates et al. ................. 345/837
6,259,448 B1 * 7/2001 McNally et al. ............ 345/733
6,717,600 B2 * 4/2004 Dutta et al. ................. 345/862

FOREIGN PATENT DOCUMENTS

| EP | 0 540 925 A1 | 5/1993 |
| EP | 0 684 541 A2 | 11/1995 |
| JP | 6-59838 | 3/1994 |
| JP | 8-511637 | 12/1996 |
| JP | 9-244843 | 9/1997 |

OTHER PUBLICATIONS

European Search Report EP 00 30 0925, Oct. 25, 2002.
Icon Variations Represent Properties of an Object, IBM Technical Disclosure Bulletin, vol. 33, No. 5, Oct. 1990 (3 pages).
Double-Click Direct Manipulation to Override Defaults, IBM Technical Disclosure Bulletin, vol. 35, No. 7, Dec. 1992 (2 pages).
New Icons, IBM Technical Disclosure Bulletin, vol. 39, No. 10, Oct. 1996 (3 pages).

* cited by examiner

Primary Examiner—Kristine Kincaid
Assistant Examiner—Thanh Vu
(74) Attorney, Agent, or Firm—Edwards & Angell, LLP; Howard M. Gitten; David G. Conlin

(57) ABSTRACT

An information processing apparatus includes an operation detecting unit which detects a predetermined operation performed on a first icon which has been dragged to a second icon, the first icon moving with movement of a pointing device, and includes a condition update unit which updates a processing condition in information processing based on the detection by the operation detecting unit. The condition update unit updates the processing condition based on the detection by the operation detecting unit and accordingly the user can update the processing condition with a simple manipulation.

19 Claims, 13 Drawing Sheets

FIG. 3
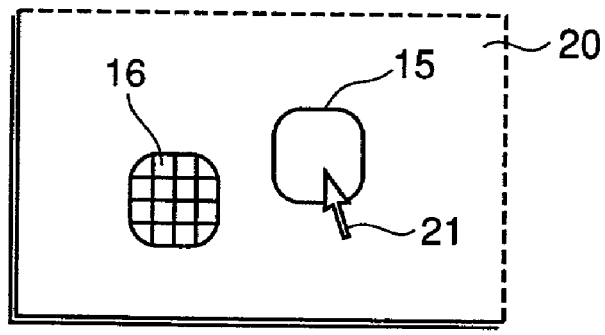
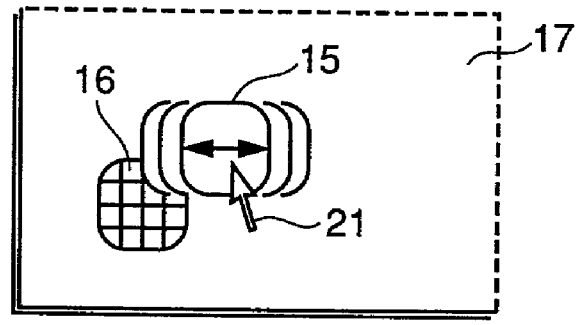
FIG. 4A
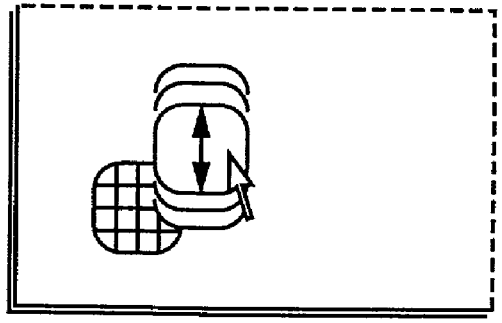
FIG. 4B

INFORMATION PROCESSING APPARATUS AND METHOD WITH GRAPHICAL USER INTERFACE ALLOWING PROCESSING CONDITION TO BE SET BY DRAG AND DROP, AND MEDIUM ON WHICH PROCESSING PROGRAM THEREOF IS RECORDED

BACKGROUND OF THE INVENTION

1. Field of the Invention

The present invention relates to information processing apparatuses each constructed with a display device, an input device and external equipment as required that are connected thereto. In particular, the invention relates to an information processing apparatus having a graphical user interface for executing predetermined processing by a drag and drop operation of an icon.

2. Description of the Background Art

With the advance of information processing technique of these days, a method is prevailing by which a user manipulates an information processing apparatus in interactive manner. In the information processing apparatus such as personal computer, portable information device and the like, a graphical user interface is provided to display a group of icons on a screen of a display device which is connected to or placed in the information processing apparatus and accordingly perform basic operations such as execution of a program, file processing and the like.

By the graphical user interface mentioned above, an icon displayed on the screen that represents a file is dragged by a pointing device such as mouse and the like for input to an icon representing an execution program for processing the file or an icon representing a file set so as to execute information processing using that file or changing the storage location of the file. A method and a user interface for implementing this are known and one example thereof is disclosed in U.S. Pat. No. 5,583,984.

This disclosure teaches a method and a computer system for implementing a graphical user interface with enhanced operability. This graphical user interface enables a user to open or close an enclosure such as window by dragging an object (icon) such as file using a mouse and the like. When a window including a destination icon is closed on which the icon is to be dropped, another icon is dragged to an icon which represents the closed window and then any manipulation is conducted so that the closed window is automatically opened.

An information processing system is well-known which connects a printer as peripheral equipment and a personal computer or portable information device as information processing apparatus by means of network connection such as LAN or one-to-one connection and uses a pointing device such as mouse and an input device such as keyboard so as to output any document from the printer by dragging an icon displayed on a screen and representing the document to an icon representing the printer.

Japanese Patent Laying-Open No. 6-59838, for example discloses a printer control system employed in the conventional system described above by which an icon representing a printer is changed after printing processing to display a print waiting status and then the icon is further manipulated to enable a job in a queue to be processed.

A graphical user interface for facilitating processing between a printer and an information processing apparatus as discussed above is disclosed in Japanese Patent Laying-Open No. 9-244843. The invention disclosed therein aims to achieve a structure which integrates various setting items relating to the printer as desired and displays them for setting. An information processing system is disclosed therein, for example, by which a controller associated with sheet setting is designated and dragged to a location in a space of a user defined panel, then the controller is copied in that space. Accordingly, a plurality of controllers are displayed simultaneously on the user defined panel so that a plurality of items can be set using each controller on the user defined panel.

However, when predetermined processing is to be carried out in the conventional information processing apparatus, if a dragged icon of a file is dropped on an icon representing a start-up program, a group of icons, a printer or the like, the processing is started on default setting conditions. In this case, a desired change in setting cannot be made before the start of the processing.

In the above information processing system connecting the information processing apparatus and the printer, for example, when print processing is to be started, an icon representing document is dragged to and dropped on an icon representing the printer according to the conventional manner. Even if setting regarding a sheet to be used, magnification and the like should be changed for printing, the document would be printed with contents according to default setting (initial setting) and thus change in setting before starting the processing is impossible.

A problem in U.S. Pat. No. 5,583,984 and Japanese Patent Laying-Open No. 6-59838 is accordingly that change in various settings for printing is impossible when an icon representing document to be printed is dragged to and dropped on an icon representing the printer because the printing program is just started with the default setting.

According to a technique disclosed in Japanese Patent Laying-Open No. 9-244843, just a copy of an item of setting is implemented by the drag and drop operation between windows. The drop operation cannot start a printing program. The manipulation is redundant in that a setting item is changed and thereafter a document icon should again be dragged to and dropped on a printer icon.

According to the conventional techniques described above, the printing operation is supported by employing the graphical user interface which enables printing with a simple drag and drop operation. Nevertheless, troublesome manipulation is required in changing printing setting from the previous setting or initial setting status, by setting printer conditions first and then issuing a printing instruction by a usual manner or performing the drag and drop operation after the setting.

SUMMARY OF THE INVENTION

One object of the present invention is to provide information processing apparatus and method which enable processing conditions to be changed easily by a drag and drop manipulation, and a medium on which a processing program thereof is recorded.

Another object of the present invention is to provide information processing apparatus and method with enhanced operability which enable a plurality of conditions to be changed with a simple manipulation, and a medium on which a processing program thereof is recorded.

According to one aspect of the invention, an information processing apparatus includes a pointing device, a display unit displaying a plurality of icons, a detection unit detecting a predetermined operation performed on a first icon which has been dragged to and not been dropped on a second icon, the first icon displayed on the display unit and moved with movement of the pointing device, and a condition update unit updating a processing condition in information processing based on the detection by the detection unit.

The condition update unit updates the processing condition in information processing according to the detection by the detection unit so that a user can update the processing condition by a simple manipulation.

According to another aspect of the invention, an information processing method in an information processing apparatus including a pointing device and a display unit displaying a plurality of icons includes the step of detecting a predetermined operation performed on a first icon which has been dragged to and not been dropped on a second icon, the first icon moved with movement of the pointing device, and the step of changing a processing condition in information processing based on the result of detection.

The processing condition in information processing is changed according to the result of detection so that a user can update the processing condition by a simple manipulation.

According to a further aspect of the invention, a computer readable recording medium recorded thereon a program for executing an information processing method in an information processing apparatus which includes a pointing device and a display unit displaying a plurality of icons is provided. The information processing method includes the step of detecting a predetermined operation performed on a first icon which has been dragged to and not been dropped on a second icon, the first icon moved with movement of the pointing device, and the step of changing a processing condition in information processing based on the result of detection.

The processing condition in information processing is changed according to the result of detection so that a user can update the processing condition by a simple manipulation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates that a start-up icon and a target icon are displayed on the information processing apparatus.

FIGS. 4A and 4B illustrate a predetermined manipulation implemented by dragging the target icon, FIG. 4A showing the target icon which is horizontally reciprocated and FIG. 4B showing the target icon which is vertically reciprocated.

DESCRIPTION OF THE PREFERRED EMBODIMENTS

Figure 1:
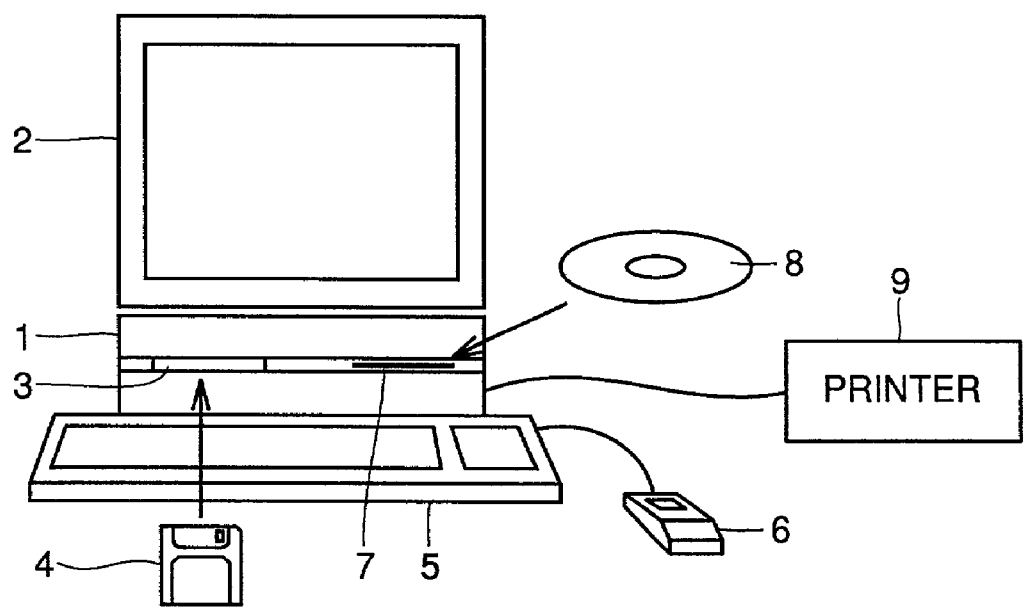
FIG. 1 illustrates an external view of an information processing apparatus according to the present invention.

FIG. 1 illustrates an external view of an information processing apparatus in an embodiment of the present invention. The information processing apparatus includes a computer body 1, a graphic display device 2, an FD (Floppy Disk) drive 3 in which an FD is placed, a keyboard 5, a mouse 6, a CD-ROM (Compact Disk-Read Only Memory) device 7 in which a CD-ROM is placed, and a printer 9. An information processing program is supplied by a storage medium such as an FD 4, a CD-ROM 8 and the like. The information processing program is executed in computer body 1, and an operator manipulates mouse 6 while watching graphic display device 2 and thus performs a drag and drop operation and the like as described below. The information processing program may be supplied through a communication line from another computer to computer body 1 via a communication modem (not shown).

Figure 2:
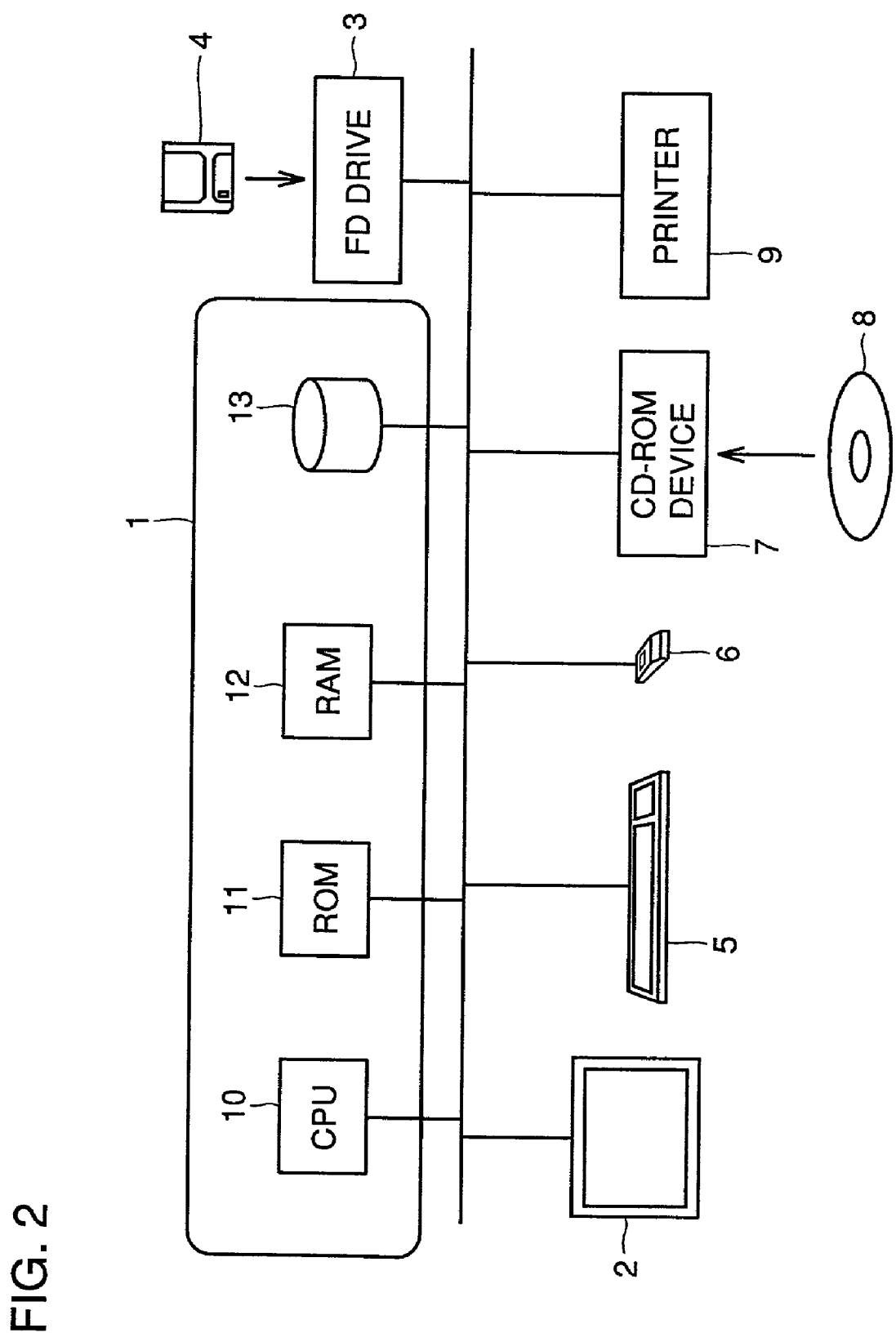
FIG. 2 is a block diagram illustrating an entire structure of the information processing apparatus in an embodiment of the invention.

FIG. 2 is a block diagram illustrating a structure of the information processing apparatus of the invention. Computer body 1 shown in FIG. 1 includes a CPU (Central Processing Unit) 10, a ROM (Read Only Memory) 11, a RAM (Random Access Memory) 12 and a hard disk 13. CPU 10 executes processing while supplying and receiving data to and from graphic display device 2, FD drive 3, keyboard 5, mouse 6, CD-ROM device 7, printer 9, ROM 11, RAM 12 or hard disk 13. The information processing program recorded on FD 4 or CD-ROM 8 is first stored in hard disk 13 by CPU 10 via FD drive 3 or CD-ROM device 7. CPU 10 appropriately loads the information processing program from hard disk 13 into RAM 12 and executes the program for drag and drop processing and the like.

First Embodiment

Embodiments which are hereinafter described are applied to printing processing executed by printer 9 and computer body 1 as one example of the information processing and applied to processing relating to setting in the printing processing for the purpose of description. However, the invention is not limited to the printing processing only. The information processing may be any of those which can be started with change in the setting and examples are various browsers (internet browsing processing), editor (document data processing), multimedia processing for image data, sound data and the like (display, conversion, sound recording, playback, copy, coupling etc.), communication (facsimile, electronic mail, file transmission), file processing (copy, delete, movement, share, display/not display, compression and expansion). Various applications are of course possible within the scope of the invention.

The input/output devices such as graphical display device 2 and mouse 6 may be integrally provided to computer body 1 or separately provided thereto. The portion executing processing for control may be implemented partially or totally by a program recorded on a recording medium which can be read by computer body 1 or by hardware such as gate array or by both of them.

As the input tool, mouse 6 which is a commonly employed pointing device for input may be used or other various input devices such as keyboard 5, tablet and the like may be used.

In this embodiment, when a predetermined file is to be printed out, an icon representing the file is dragged to and dropped on an icon representing a printer (this manipulation is hereinafter referred to as drag and drop), and thus default printing is easily carried out. Further, printing with changed setting (sheet size, single sided/double sided, output location etc.) can be achieved by a similar manipulation as that for the default printing.

FIG. 3 illustrates a display screen on which a pointer 21 which moves according to the movement of mouse 6 is displayed. Here, a start-up icon 16 representing printer 9 and a target icon 15 representing document to be output are displayed.

Pointer 21 can move target icon 15. Specifically, pointer 21 is first positioned on target icon 15 and then moved to an arbitrary location while the button of mouse 6 is depressed (drag operation). Target icon 15 is thus dragged to and overlaid on start-up icon 16 which is displayed at an arbitrary position on the display screen. At this time, the button of mouse 6 is released (drop operation), for example, so that the position of displayed target icon 15 is arbitrarily fixed. In this embodiment, when target icon 15 is overlaid on start-up icon 16, target icon 15 is fixed at this position.

When the drop operation causes target icon 15 to be fixed on start-up icon 16, CPU 10 reads information on document data represented by or associated with the target icon from RAM 12 or the like so as to output the document data to printer 9 represented by start-up icon 16.

In the conventional system, the operation started by the drag and drop operation as described above (printing operation by the printer, for example) is limited to an operation with its contents based on predetermined conditions and the printing operation is thus carried out under the predetermined conditions.

In this embodiment, the conditions can be changed, before target icon 15 is overlaid and dropped on start-up icon 16, by a predetermined manipulation of target icon 15, for example, by moving target icon 15 over start-up icon 16 or making target icon 15 stationary thereon for a certain time as shown in FIGS. 4A and 4B.

The predetermined manipulation above is not limited to a particular one. For example, if target icon 15 is moved over start-up icon 16, target icon 15 may be moved repeatedly from side to side as shown in FIG. 4A or may be moved up and down repeatedly as shown in FIG. 4B. Further, the manner of depressing the mouse button may be changed. If the mouse has a plurality of buttons, in addition to the manipulation for the drag and drop which is done by depressing a button for dragging and (simultaneously) depressing other input means (mouse button, keyboard and the like), another operation may be performed simultaneously or at different time. Start-up conditions can be set in more detail in such a way that the conditions are changed depending on the number of times the icon is reciprocated.

Figure 5A:
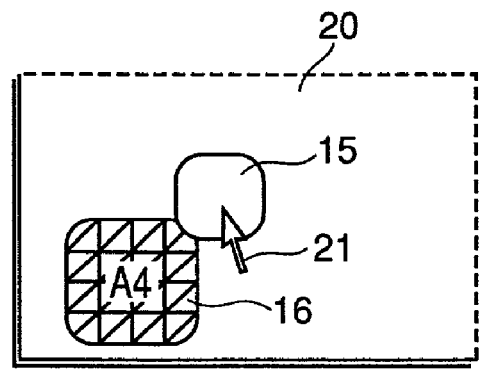
FIGS. 5A and 5B illustrate a change in the form of displaying the start-up icon occurring when the target icon is dragged thereto, "A4" and "B4" displayed respectively in FIG. 5A and FIG. 5B.
Figure 5B:
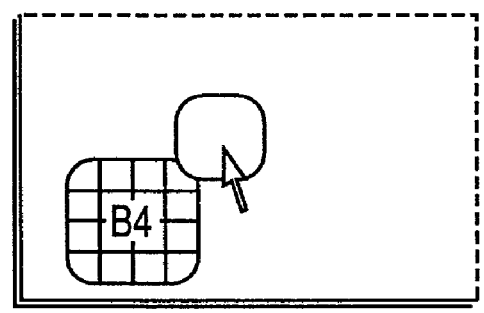

Here, if start-up icon 16 is arranged to change its display form according to the conditions set by a predetermined manipulation of target icon 15, as shown in FIGS. 5A and 5B, the contents set by the user can easily be recognized.

Referring to FIGS. 5A and 5B, when the sheet size is changed from A4 size to B4 size on start-up icon 16, the label of start-up icon 16 is changed from "A4" to "B4." In addition, the color of the icon may be changed, for example, and if the display colors are just black and white, hatching or various patterns may be add to the icon so as to give change in appearance.

Further, the display form may be changed by changing the shape of the icon. For example, as the sheet size of B4 is larger than the A4 size, the icon labeled as B4 may be made larger relative to the icon labeled as A4. Those changes of icons may be combined.

Figure 6:
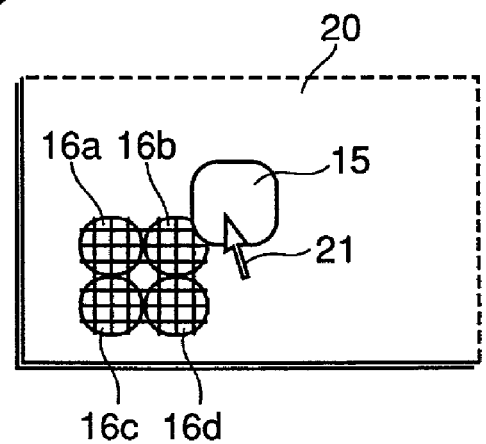
FIG. 6 illustrates a display status of a target icon and a start-up icon consisting of a plurality of icons.
Figure 7:
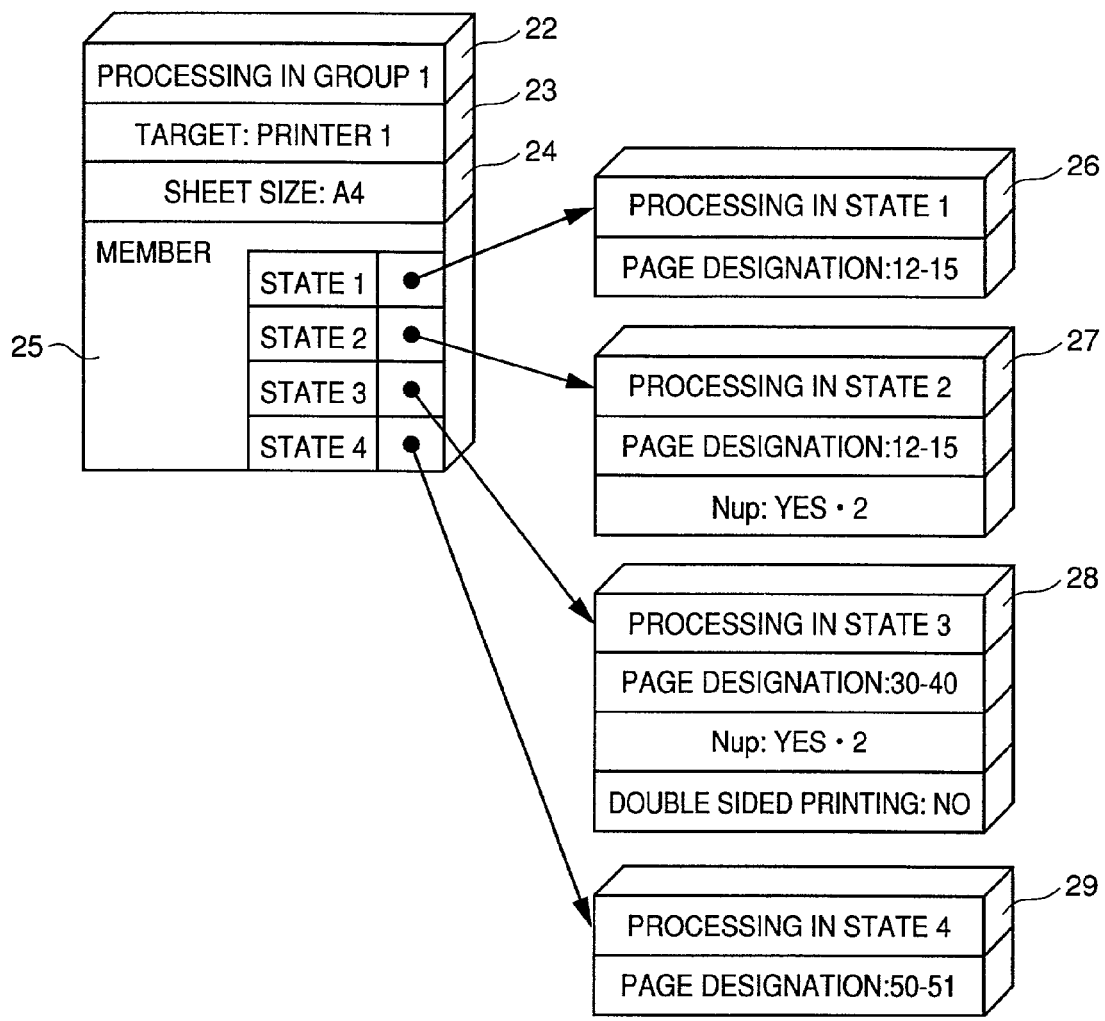
FIG. 7 illustrates an exemplary relation between multiple icons constituting a start-up icon and contents of processing associated with the icons.

Start-up icon 16 may be a group of icons (16a–16d) as shown in FIG. 6. Referring to FIG. 7, suppose that a single start-up icon 16 represents processing 22 in group 1. Processing 26 in state 1 to processing 29 in state 4 are shown as conditions (member 25). If start-up icon 16 is a single icon, the manner of manipulating target icon 15 (variation) is limited. Change of processing 26 in state 1 to processing 29 in state 4 is accordingly difficult.

On the other hand, if the start-up icon is displayed as a group of 4 icons as shown in FIG. 6, for example, 4 types of setting instructions are possible just by performing the horizontal or vertical reciprocation as shown in FIG. 4A or 4B on each of icons 16a to 16d.

Figure 8:
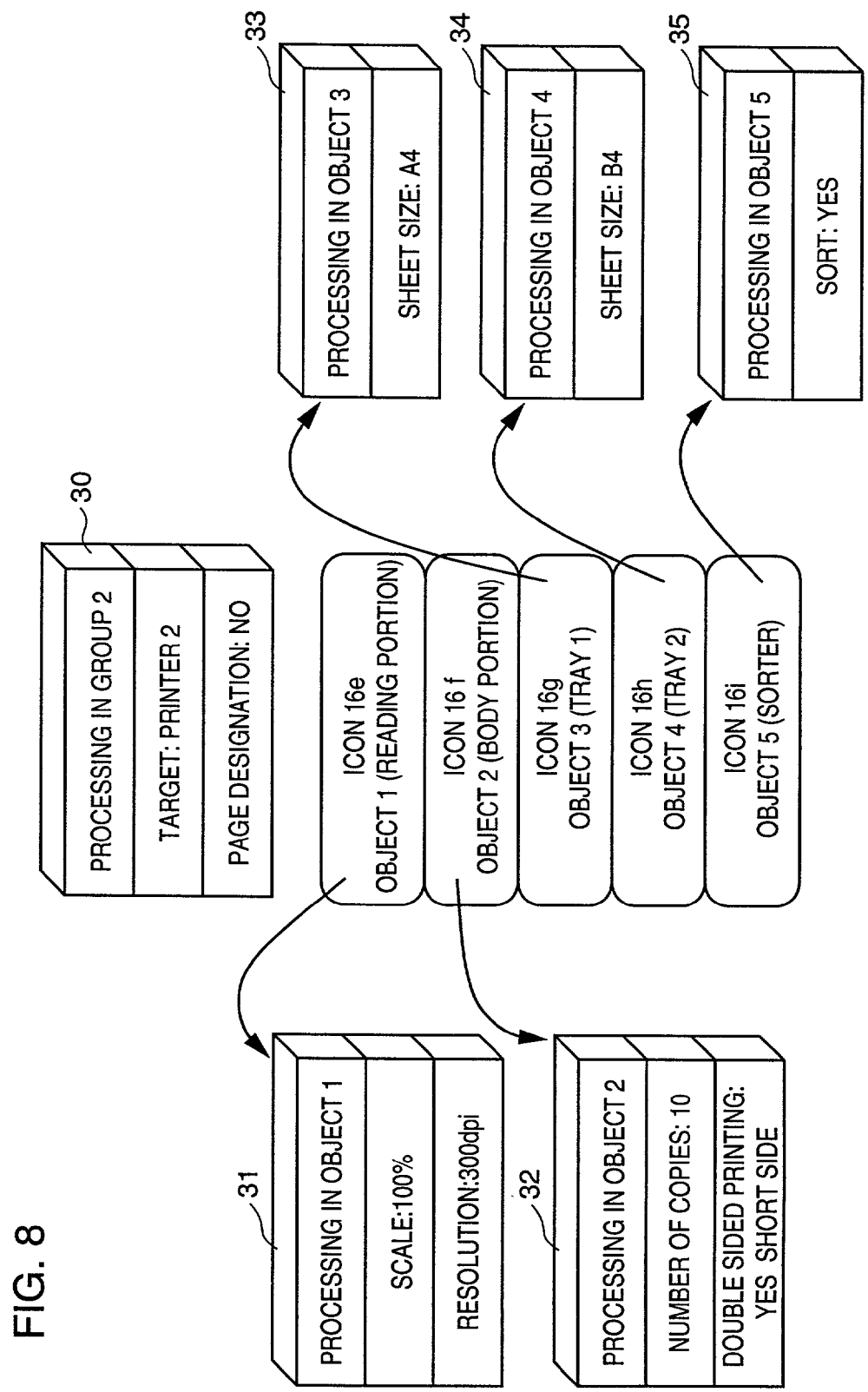
FIG. 8 illustrates another exemplary relation between multiple icons constituting a start-up icon and contents of processing associated with the icons.

Another example of the group of icons is shown in FIG. 8. Here, processing 30 (printer 2, no page designation) in group 2 is represented by start-up icon 16 as a whole. Start-up icon 16 consists of a combination of five laterally elongate icons 16e to 16i, for example. Icons 16e to 16i correspond respectively to processing 31 in object 1 to processing 35 in object 5. Objects 1 to 5 are associated with the reading portion, body portion, tray 1, tray 2 and sorter of printer 9 and various settings of each object are possible by icons 16e to 16i.

If start-up icon 16 is a group of icons, each icon is preferably an element icon, i.e. an icon associated with a plurality of items in condition setting. Examples of setting items are sheet size selection, setting of the rate of scaling up and down, designation of the number of copies to be made, page designation, and the like. Element icons associated respectively with these conditions are provided to form a group.

If start-up icon 16 consists of a group of such element icons, the predetermined manipulation discussed above is made for each element icon. Consequently, conditions can be set systematically and efficiently to facilitate setting manipulation.

Figure 9:
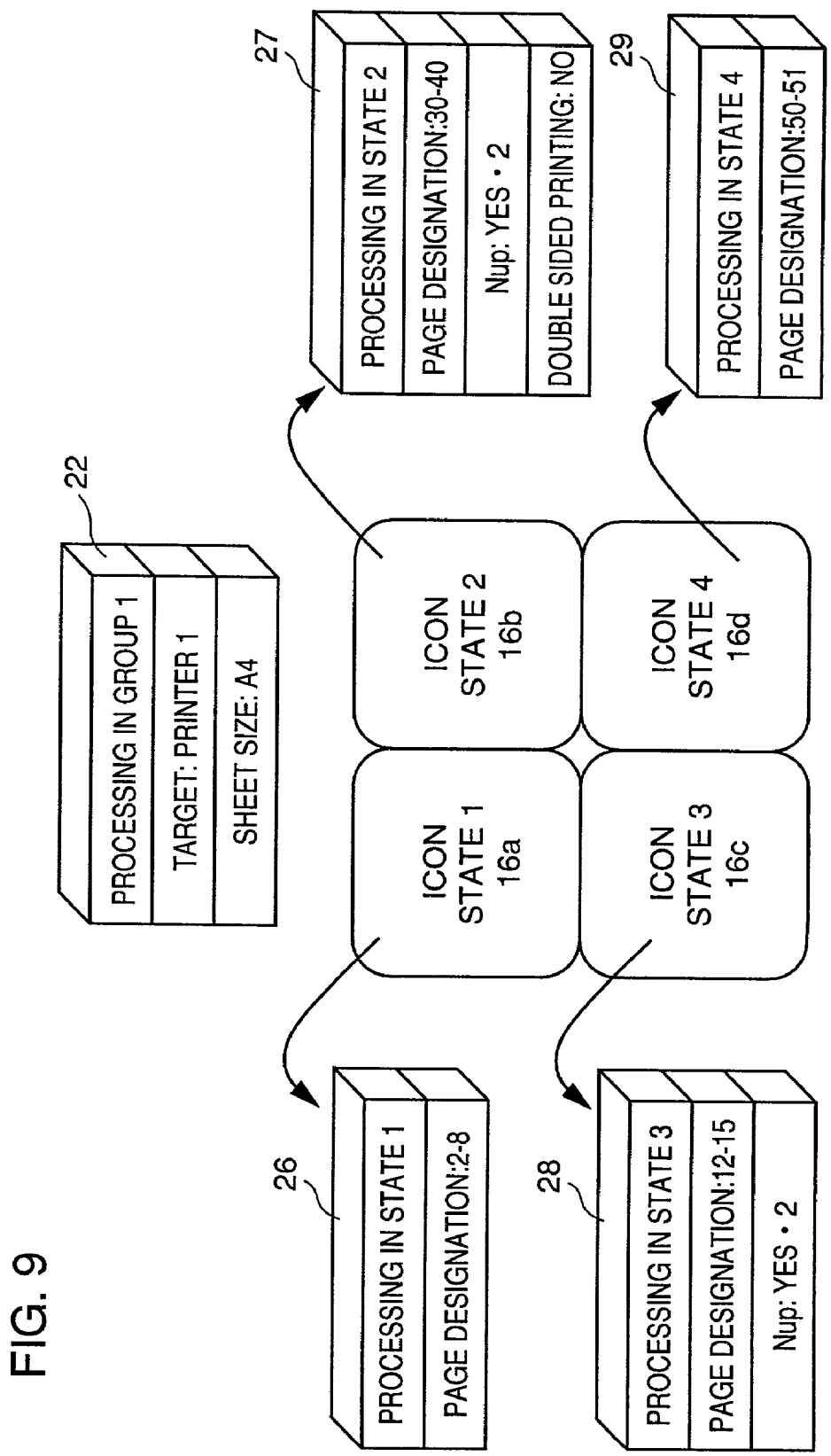
FIG. 9 illustrates still another exemplary relation between multiple icons constituting a start-up icon and contents of processing associated with the icons.

Further, the element icons may be associated with a combination of setting items with their conditions frequently changed. When start-up icon 16 represents printer 9, four element icons 16a to 16d are associated respectively with processing 26 in state 1 to processing 29 in state 4 as shown in FIG. 9, for example. In processing 22 in group 1, the sheet size is A4 as a basic condition. Under this condition, selection can be made from processing 26 in state 1 to processing 29 in state 4.

In each of processing 26 to processing 29 under the condition above, each state is a combination of a plurality of conditions. For example, conditions are set such as "Page Designation 2 to 8 " in state 1, "Page Designation 30 to 40, Nup: Yes and Double Sided Printing: No" in state 2, and so on. Compared with the case in which each item is associated with an element icon, selection can easily be made and thus display can be made compact. Nup here denotes the number of pages printed on one sheet.

Figure 10:
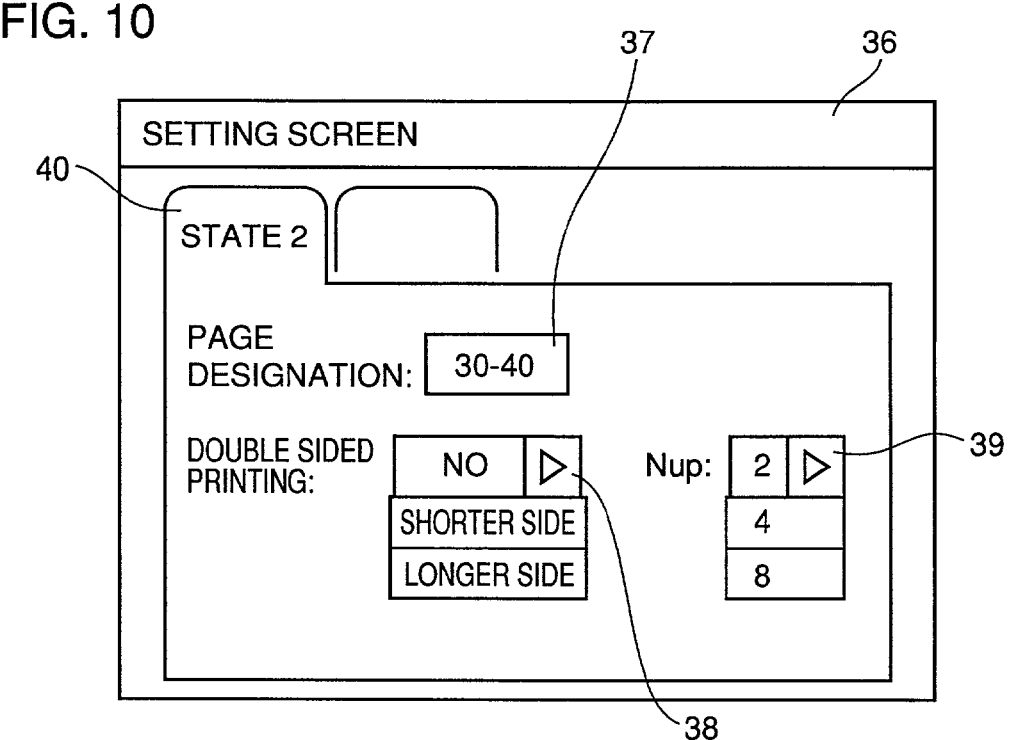
FIG. 10 illustrates an exemplary screen for setting contents of processing associated with a start-up icon.

The user can determine the combination of conditions in each element icon appropriately as desired. Referring to FIG. 10, conditions may be set in advance in item 37 as page designation, in item 38 as double sided printing designation, and in item 39 as Nup setting. FIG. 10 illustrates an example of setting those conditions in state 2, and a tag 40 may be provided to change the state on the same screen.

Figure 11:
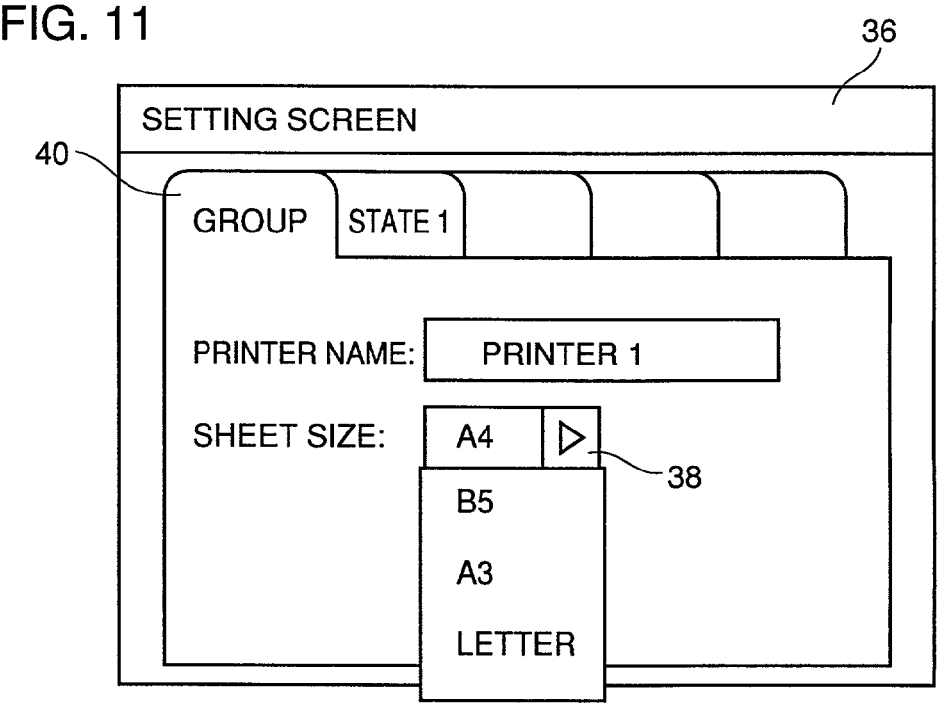
FIG. 11 illustrates another exemplary screen for setting contents of processing associated with a start-up icon.

The contents of setting in the element icons may be changed all together. For example, when printer 9 associated with start-up icon 16 and having no double-sided printing unit is newly provided with the double-sided printing unit, the basic setting in a plurality of element icons having an item for double-sided printing designation are just changed to set the condition of double-sided printing in all the element icons. Referring to FIG. 11, for example, the sheet size is just changed from A4 to another size by the pull down menu in item 38 for sheet size setting on a screen 36 so that all sheet sizes in a plurality of sheet icons can be changed.

Figure 12:
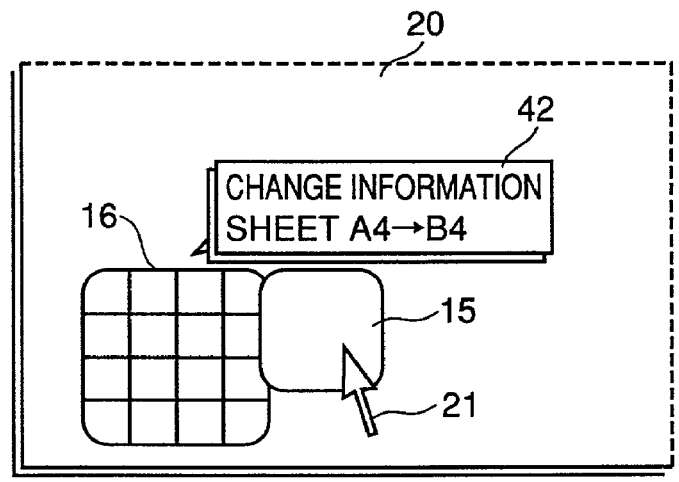
FIG. 12 illustrates a form of displaying processing contents of a startup icon when a target icon is dragged near to the start-up icon.

When the condition is changed as described above associated with the icon, the display manner of the icon is changed according to the change of condition as shown in FIGS. 5A and 5B. However, as shown in FIG. 12, another icon 42 may be displayed near start-up icon 16 so as to show details of the changed condition.

When the predetermined manipulation as described above is performed, target icon 15 is moved over start-up icon 16 or temporarily stopped. In this case, the display on the start-up icon ("A4" and "B4" labels in FIGS. 5A and 5B) could become undistinguishable. On the other hand, if a separate icon 42 is displayed in the vicinity of start-up icon 16 (especially in the location which does not overlap target icon 15 and start-up icon 16) as shown in FIG. 12 so as to display the information on the change (represented in FIG. 12 as "Change Information Sheet A4→B4," the user can easily recognize the information on the change even if target icon 15 is manipulated over start-up icon 16.

As heretofore described, in the information processing apparatus of this embodiment, target icon 15 is dragged and subjected to a predetermined manipulation in the vicinity of start-up icon 16 so as to change processing conditions to be set. The processing conditions can thus be changed without deteriorating the operability of the drag and drop.

Start-up icon 16 is displayed with its form or the like changed depending on the processing conditions, so that the user can easily recognize the contents of the set processing conditions. Further, a plurality of processing conditions can be set by providing start-up icon 16 as a group of icons.

The operability of the information processing apparatus is improved by providing start-up icon 16 as a plurality of element icons to set a plurality of conditions in each element icon. The operability is further enhanced by enabling the contents of setting in the element icons to be changed all together. In addition, the user can easily distinguish the contents of the processing condition if the processing condition associated with start-up icon 16 is separately displayed.

Second Embodiment

In the first embodiment, start-up icon 16 is constituted of a plurality of element icons from the start. The second embodiment is to provide a single start-up icon 16 initially and then change start-up icon 16 into a plurality of element icons by performing a predetermined manipulation on a target icon 15.

In the first embodiment discussed above in which start-up icon 16 is originally a group of element icons, if a large number of element icons exist or all of a large number of conditions associated with the element icons must be displayed, the display area of the element icons should be increased. As a result, single start-up icon 16 occupies a large display area so that a plurality of start-up icons 16 cannot be displayed.

Figure 13A:
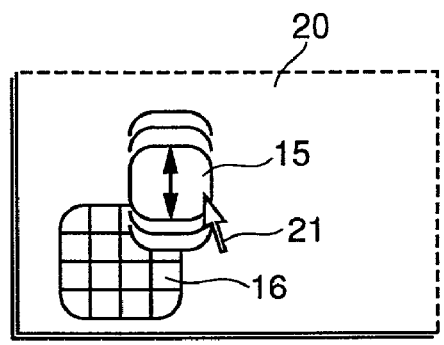
FIGS. 13A and 13B illustrate that a start-up icon is displayed by being divided into a plurality of element icons when a target icon is dragged near to the start-up icon.
Figure 13B:
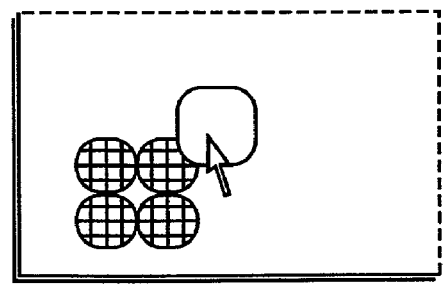

Referring to FIGS. 13A and 13B, in this embodiment, target icon 15 is dragged to originally single start-up icon 16, and then target icon 15 is manipulated to laterally reciprocate over start-up icon 16 repeatedly in order to change the state as shown in FIG. 13A to the group of element icons as shown in FIG. 13B.

In this way, start-up icon 16 can be implemented as a single icon or as a group of element icons 16a to 16d as required. The limitations above on display and operability when conditions are set are alleviated. The display and user interface can accordingly be realized which are distinguishable and easy to operate by the user without complicating display on the display unit.

Other start-up manipulations concerning start-up icon 16 and target icon 15 in the second embodiment are similar to those in the first embodiment and detailed description thereof is not repeated here.

As described above, in the information processing apparatus of this embodiment, a predetermined manipulation is performed on target icon 15 in the vicinity of a single start-up icon 16 so as to display a plurality of element icons. Display which is easily distinguishable by the user and superior in operability can thus be achieved.

Third Embodiment

Figure 14:
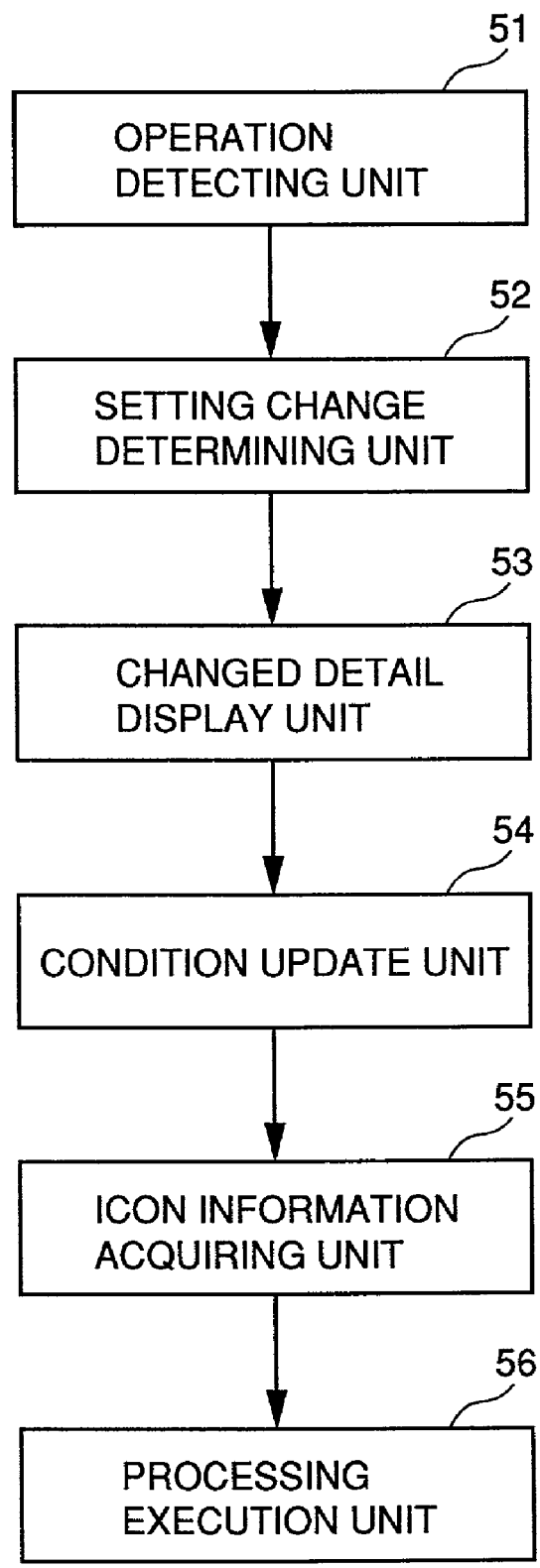
FIG. 14 is a block diagram illustrating a functional structure of an information processing apparatus in a third embodiment.

FIG. 14 is a schematic block diagram illustrating a functional structure of the information processing apparatus in the above first and second embodiments. The information processing apparatus includes an operation detecting unit 51 detecting a predetermined operation performed on target icon 15 which has been dragged to start-up icon 16, a setting change determining unit 52 determining whether or not conditions are changed, a changed detail display unit 53 displaying details of change of conditions, a condition update unit 54 updating details of the condition change, an icon information acquiring unit 55 acquiring information on target icon 15 and start-up icon 16, and a processing execution unit 56 executing processing based on the information on target icon 15 and on start-up icon 16. Those functions are implemented by the information processing program described above.

Figure 15:
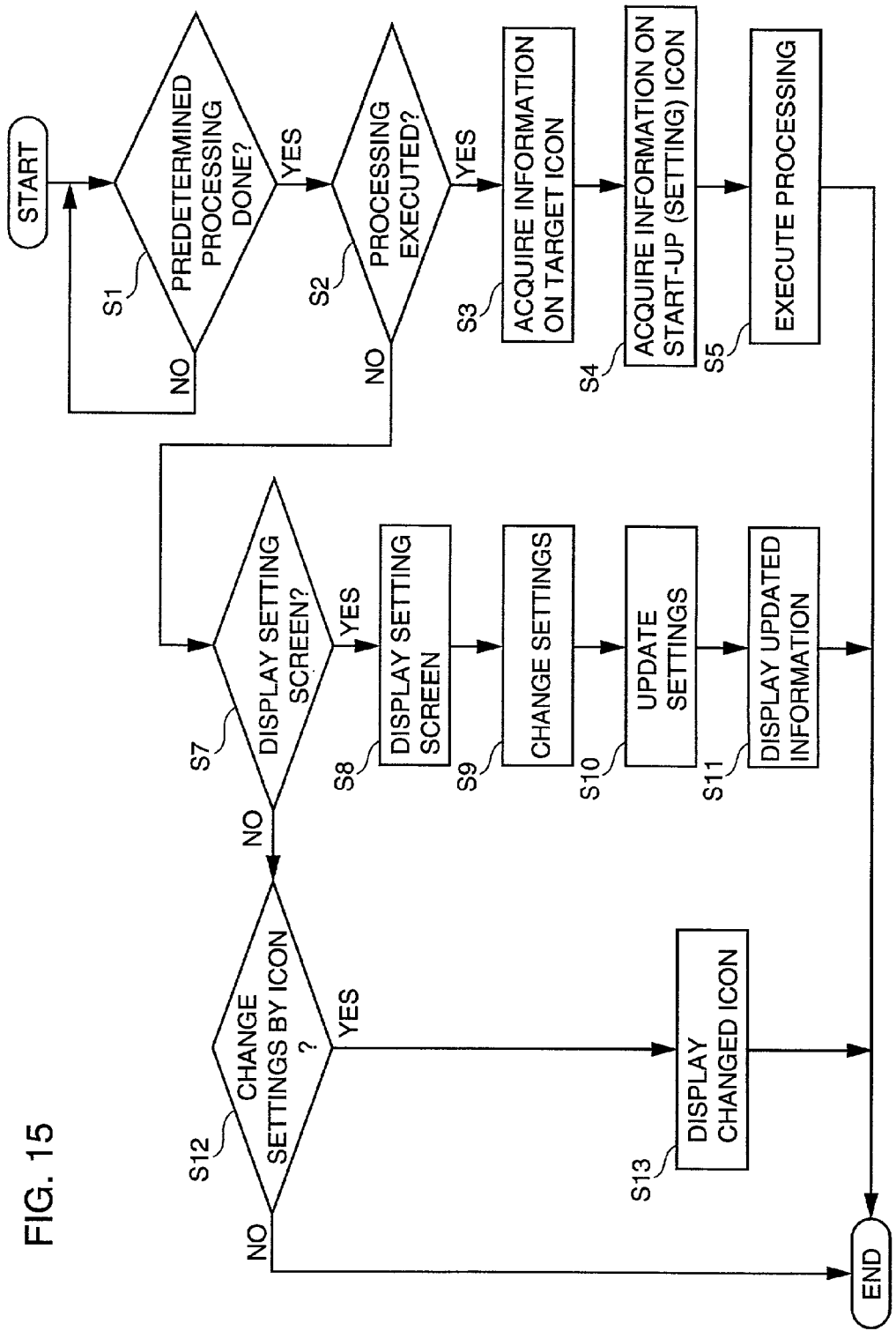
FIG. 15 is a flow chart illustrating a processing procedure of the information processing apparatus in the third embodiment.

FIG. 15 is a flow chart illustrating a processing procedure of the information processing apparatus shown in FIG. 14. First, operation detecting unit 51 determines whether or not the above predetermined operation is performed on target icon 15 which has been dragged to start-up icon 16 (S1). If the predetermined operation is not conducted (No in S1), this determination is repeated.

If the predetermined operation is performed (Yes in S1), determination is made whether or not processing associated with start-up icon 16 is to be done (S2). If the processing associated with start-up icon 16 is determined to be done (Yes in S2), icon information acquiring unit 55 acquires information concerning target icon 15 (S3) and acquires information concerning start-up icon 16 (S4). Processing execution unit 56 then executes processing according to the information on target icon 15 and start-up icon 16 obtained by icon information acquiring unit 55 (S5).

No processing associated with start-up icon 16 is determined to be done (No in S2), determination is made whether or not conditions are displayed on the screen for setting (S7). If the conditions are determined to be displayed on the screen (Yes in S7), changed detail display unit 53 displays conditions to be changed on the screen (S8). When the user changes conditions (S9), condition update unit 54 updates details of set conditions (S10). Changed detail display unit 43 then displays information on the change of conditions (S11), and accordingly this process is completed. It is noted that information on whether or not the conditions are displayed on the screen for setting is preliminary given by the user.

If determination is made so as not to display conditions for setting on the screen (No in S7), whether or not set conditions are changed by start-up icon 16 is determined (S12). If the determination indicates that the set conditions are to be changed by start-up icon 16 (Yes in S12), the set conditions are changed by changing the display of start-up icon 16, for example, characters, color, shape, pattern or the like of start-up icon 16 (S13), and accordingly the process is completed.

If determination is made so as not to change set conditions by startup icon 16 (No in S12), the process is completed as it is. It is noted that information on whether or not the set conditions are changed by start-up icon 16 is given by the user in advance.

Figure 16B:
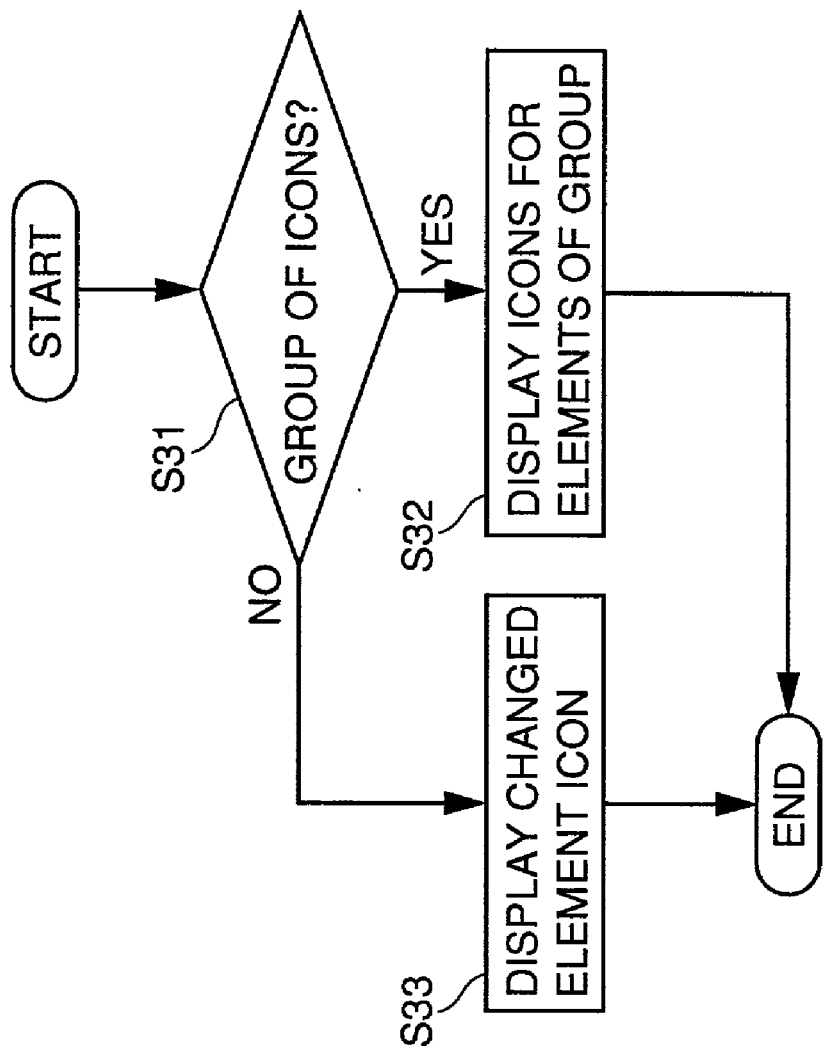
FIGS. 16A and 16B are flow charts illustrating in detail step S13 in FIG. 15, FIG. 16A showing that display of an element icon only is changed and FIG. 16B showing that display is changed as a group of icons.
Figure 16A:
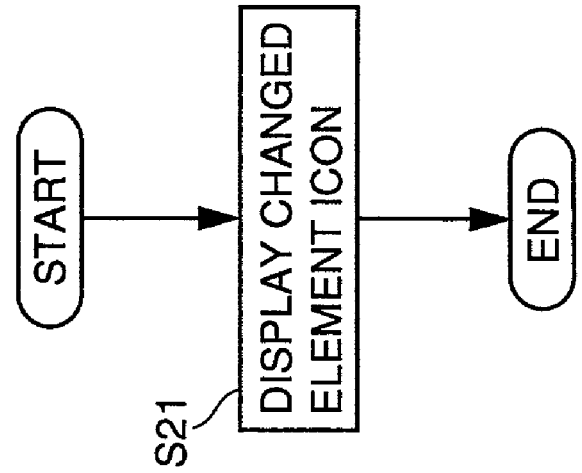

FIGS. 16A and 16B are flow charts illustrating in detail the processing in step S13 in FIG. 15. FIG. 16A illustrates that display of the element icon only is changed (S21).

FIG. 16B illustrates that display of a group of icons or the element icon is changed. First, whether or not a displayed icon is a group of icons is determined (S31). If a group of icons is displayed (Yes in S31), icons are displayed as elements of the group (S32) and this process is completed. If the displayed icon is not the group of icons (No in S31), display of the element icon is changed (S33) and this process is completed.

Figure 17:
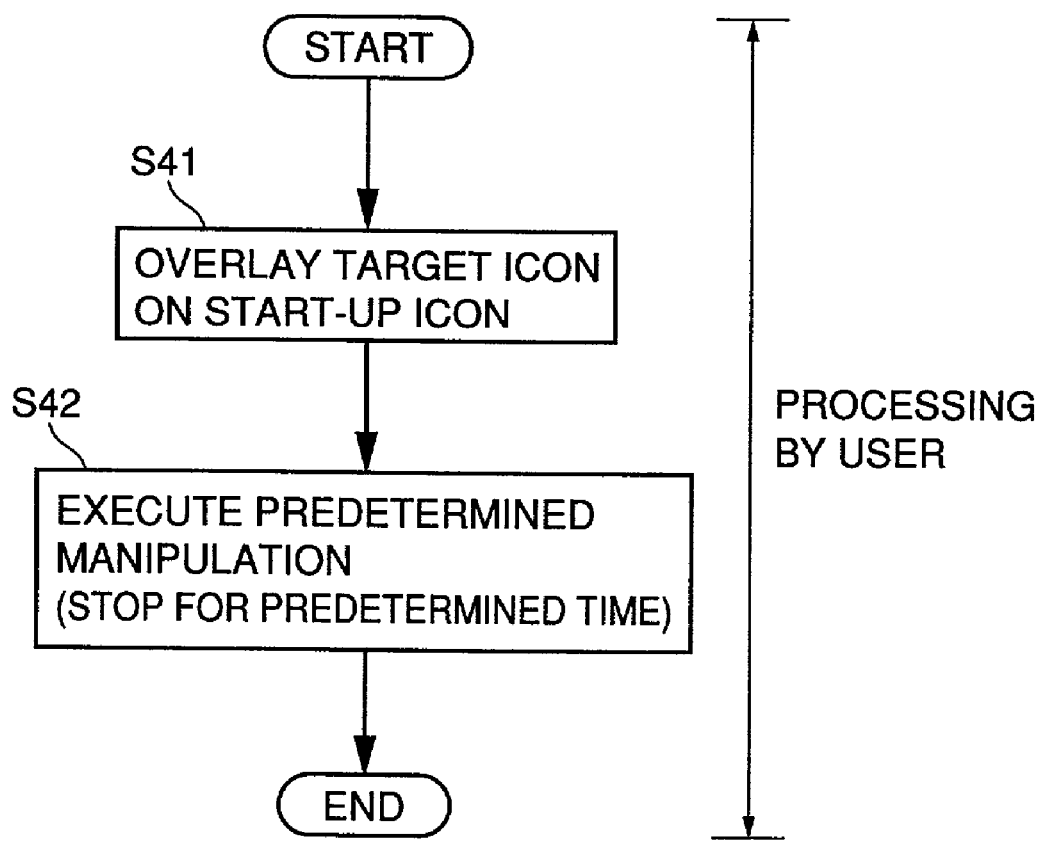
FIG. 17 is a flow chart illustrating a procedure of a predetermined operation executed by a user.

FIG. 17 is a flow chart illustrating a predetermined manipulation made by the user. The user drags target icon 15 and places it on start-up icon 16 (S41). The user performs the predetermined manipulation by horizontally or vertically reciprocating target icon 15 repeatedly near startup icon 16, or stopping target icon 15 for a predetermined time (S42).

As heretofore described, an information processing apparatus which is superior in operability can be achieved by implementing the processing according to the information processing program described in conjunction with the first and second embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information processing apparatus comprising:
   a pointing device;
   a display unit displaying a plurality of icons;
   a detection unit detecting a predetermined operation performed on a first icon which has been dragged to a second icon and moved when positioned at said second icon wherein said operation is a change of direction of movement performed on the first icon, said first icon displayed on said display unit and moved with movement of said pointing device; and
   a condition update unit changing a processing condition of the information processing, represented by the second icon, to be performed on said first icon based on the detection of the operation performed on the first icon.

2. The information processing apparatus according to claim 1, wherein said detection unit detects movement of said first icon in a predetermined direction in the vicinity of said second icon while said first icon is being dragged.

3. The information processing apparatus according to claim 1, wherein said detection unit detects stop of said first icon for a predetermined time in the vicinity of said second icon while said first icon is being dragged.

4. The information processing apparatus according to claim 1, wherein said display unit displays said second icon as a group of icons associated with said processing condition when said detection unit detects said predetermined operation.

5. The information processing apparatus according to claim 1, wherein said display unit changes a display form of said second icon according to a set processing condition.

6. The information processing apparatus according to claim 1, wherein said display unit displays a processing condition associated with said second icon in the vicinity of said second icon.

7. The information processing apparatus according to claim 1, further comprising a processing execution unit executing processing based on the processing condition in information processing changed by said condition update unit.

8. The information processing apparatus according to claim 1, wherein said second icon includes a group of icons associated with said processing condition.

9. The information processing apparatus according to claim 8, wherein at least one of said first icon, said second icon and said group of icons is preliminarily associated with said processing condition.

10. The information processing apparatus according to claim 8, wherein a combination of a plurality of processing conditions is set for each icon of said group of icons.

11. The information processing apparatus according to claim 8, wherein said display unit changes a display form of at least one of icons of said group of icons according to a set processing condition.

12. A method of processing information in an information processing apparatus including a pointing device and a display unit displaying a plurality of icons, comprising the steps of:
   detecting a predetermined operation performed on a first icon which has been dragged to a second icon, said operation being performed on said first icon of at said second icon, said first icon moved with movement of said pointing device, wherein said operation is a change of direction of movement performed on the first icon; and
   changing a processing condition of the information processing to be performed on said first icon based on a result of said detection of the operation performed on the first icon.

13. The information processing method according to claim 12, further comprising the step of displaying said second icon on said display unit as a group of icons associated with said processing condition when said predetermined operation is detected.

14. The information processing method according to claim 12, further comprising the step of changing a display form of said second icon according to a set processing condition to display on said display unit said second icon with its display form changed.

15. The information processing method according to claim 12, wherein said second icon includes a group of icons associated with said processing condition.

16. A computer readable recording medium on which a program is recorded for execution of an information processing method in an information processing apparatus including a pointing device and a display unit displaying a plurality of icons, said information processing method comprising the steps of:

detecting a predetermined operation performed on a first icon which has bean dragged to a second icon, said operation being performed on said first icon at said second icon, said first icon moved with movement of said pointing device, wherein said operation is a change of direction of movement performed on the first icon; and changing a processing condition of the information processing to be performed on said first icon based on result of said detection of the operation performed on the first icon.

17. The computer readable recording medium on which the program is recorded according to claim 16, wherein said information processing method further comprises the step of displaying said second icon on said display unit as a group of icons associated with said processing condition when said predetermined operation is detected.

18. The computer readable recording medium on which the program is recorded according to claim 16, wherein said information processing method further comprises the step of changing a display form of said second icon according to a set processing condition to display on said display unit said second icon with its display form changed.

19. The computer readable recording medium on which the program is recorded according to claim 16, wherein said second icon includes a group of icons associated with said processing condition.

* * * * *